July 8, 1958 R. J. C. SIMON 2,842,681
CONVERTER
Filed May 28, 1957
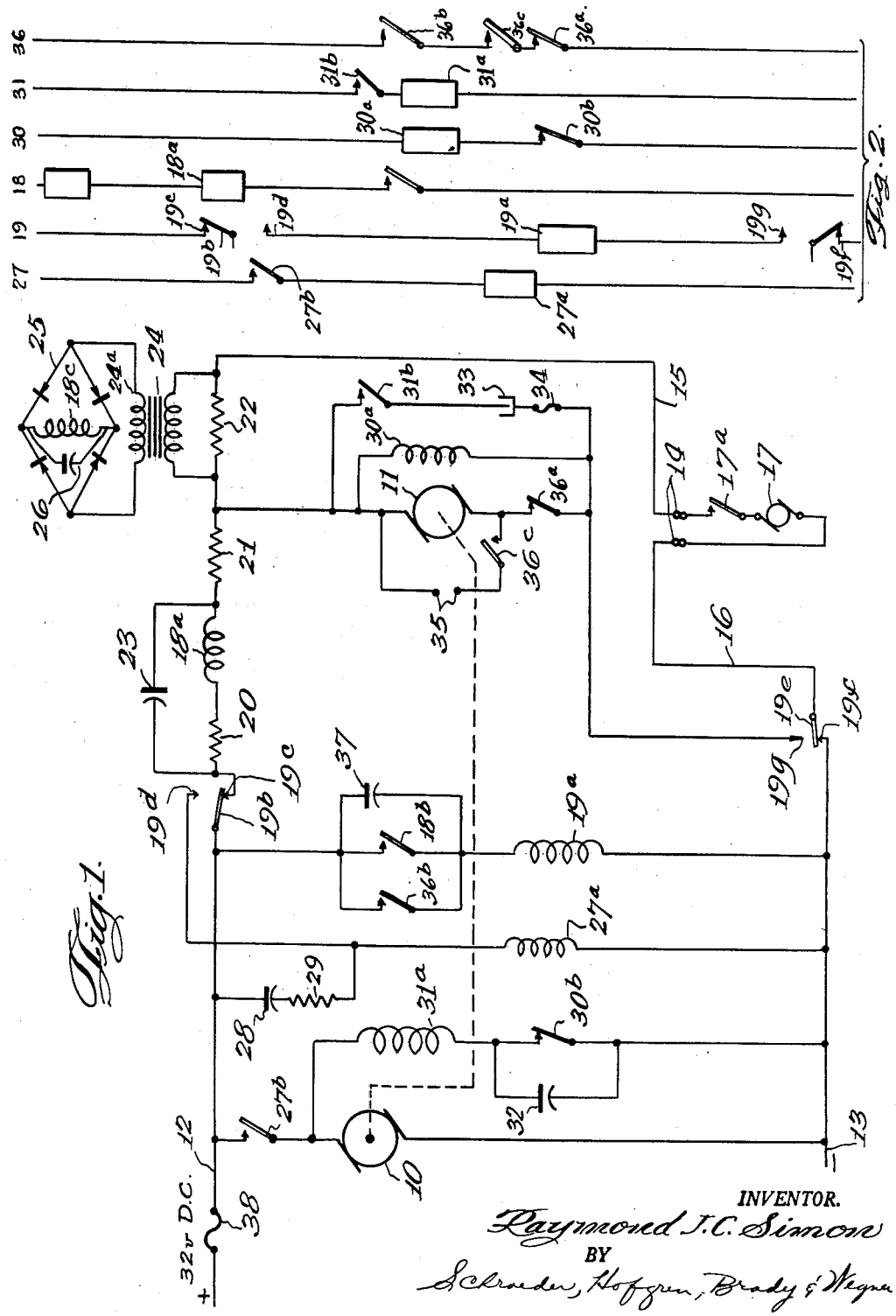
INVENTOR.
Raymond J. C. Simon
BY
Schroeder, Hofgren, Brady & Wegner
attorneys

United States Patent Office 2,842,681
Patented July 8, 1958

2,842,681
CONVERTER

Raymond J. C. Simon, Park Ridge, Ill., assignor to Carter Motor Company, a corporation of Illinois Application May 28, 1957, Serial No. 662,062

12 Claims. (Cl. 307—38)

This invention relates to an electrical power supply and in particular to a power supply converter.

Many instances arise where it is necessary to alter the electrical characteristics of a power supply so that it may serve to operate electrical apparatus designed for use with a power supply having a different characteristic. Illustratively, today many marine craft are provided with electrical power supply systems having a 32 volt, direct current characteristic. Thus, the electrical appliances, lighting devices, etc., provided for use on such a craft, are specially designed for use on such a power supply. Because of the special nature of the devices, their cost is often substantially above the cost of similar devices arranged for operation on a conventional power supply, such as the 110-120 volt 60 cycle standard alternating current power supply conventionally used in this country.

While it is possible to solve this basic problem by providing a converter (as for the conversion of power from direct to alternating current), this presents a number of additional problems. One such problem is that many of the devices do not operate continuously, and the conventional motor-generator converter would be operating often for substantial periods of time under no-load conditions. Further, many of such standard converters have poor motor-starting characteristics so that a converter of a relatively high power rating must be used which is relatively inefficient under normal running-load conditions.

The principal feature of this invention is the provision of a new and improved converter.

Another feature is the provision of such a converter which is arranged to be inoperative when no demand for power exists at the output thereof.

A further feature is the provision of a converter which is arranged to provide suitable power to a plurality of devices while having a relatively small power rating.

A still further feature is the provision of such a converter having new and improved means for adapting the device for use with loads having low power factor starting characteristics.

Still another feature of the invention is the provision of such a converter of the motor-generator type which is arranged to impress the input power supply voltage on the output power supply terminals whenever no demand for power is made on the output power supply, and to remove the input power supply voltage and replace it with the output power supply voltage whenever a demand for power is made on the output power supply.

Other features and advantages of this invention will be apparent from the following description taken in connection with the accompanying drawings wherein:

Fig. 1 is a schematic electrical diagram of a converter embodying the invention; and Fig. 2 is a schematic key diagram illustrating the relationships of the relay coils and their respective associated contacts, and the association of the contacts of the ganged switch.

In the illustrated embodiment of the invention as described in the drawings a converter is shown to comprise an input motor 10 and an output generator 11. The method of mechanically coupling the motor and generator to form the combined motor-generator means is well known in the art and requires no further description here.

The specific input and desired output power supply characteristics will, of course, determine the specific structure of motor 10 and generator 11. In the illustrated embodiment of the invention being described for marine use, for example, the input power supply is one having a direct current, 32 volt characteristic. The output power supply is one having a 120 volt, 60 cycle, alternating current characteristic. The term "characteristic" is herein defined as relating to the voltage and/or the current properties of the power supply being considered. The positive input lead is designated 12 and the negative input lead is designated 13. The output power supply is delivered to a conventional socket type terminal 14 through leads 15 and 16.

To illustrate the invention, an alternating current motor 17 such as that comprising the compressor motor of an electric refrigerator, arranged for operation from a 120 volt, 60 cycle, alternating current power supply, is connected in series with a thermostat switch 17a to socket 14 of the converter. Switch 17a and motor 17 are arranged in the conventional manner wherein an increase in the temperature within the refrigerator causes the switch to close and thereby operate the compressor to lower the temperature. At a predetermined low temperature the switch opens the circuit to the motor and discontinues operation of the compressor. In actual practice, additional relays and motor starting devices may be employed in addition to the thermostat switch 17a. Such devices are well known in the art and require no further description here.

One feature of the instant invention is the provision of power from input leads 12 and 13 to socket 14 whenever the appliance connected to the socket is not drawing power therefrom. Thus, as long as switch 17a remains open 32 volts, direct current potential is applied across terminals 14. However, when switch 17a closes to operate the compressor motor 17, this direct current potential is immediately removed from terminals 14 and the suitable 120 volt, 60 cycle alternating current potential is impressed across the terminals to operate motor 17. It is this change in the electrical condition of switch 17a (i. e., whether it is opened or closed) which causes the direct current potential of the input power supply to effect the operation of the converter.

To effect the change of power supplies on terminal 14, a direct current coil 18a of a relay 18 is connected electrically intermediate input lead 12 and output lead 15. Relay 18 is provided with a normally open contact 18b which is connected in series with a coil 19a of a second relay 19, across input leads 12 and 13. In series with coil 18a are three resistors, 20, 21 and 22. Resistors 20 and 21 are preferably a relatively high ohmic value, resistor 20 being approximately 50,000 ohms, and resistor 21 being approximately 2,200 ohms. Resistors 20 and 21 serve to limit the direct current flow through coil L3 and to socket 14. Relay 18 is preferably of a sensitive type arranged to operate with a current of approximately ¼ milliampere direct current flow through coil 18a. In parallel with the series connection of resistor 20 and coil 18a is a condenser 23. Resistor 22 is of relatively low ohmic value, illustratively ¼ ohm. A transformer 24 is connected across resistor 22 with its secondary 24a connected to a bridge rectifier 25 energizing a direct current coil 18c of relay 18. A condenser 26 is connected in parallel with coil 18c to protect the rectifier against inductive current surges.

Relay 19 is a double pole, double throw relay having a first moving contact 19b normally closed with a stationary contact 19c to complete the direct current feed from lead 12 to resistor 20. A normally open contact 19d is associated with moving contact 19b to deliver current from lead 12 to a coil 27a of a relay 27 when relay 19 is energized. In parallel with contacts 19b and 19d is a series connected condenser 28 and resistor 29 for precluding arcing when these contacts are opened. A second moving contact 19e of relay 19 is connected to lead 16 for transfer between a normally closed contact 19f connected to direct current lead 13, and a normally open contact 19g. Thus, when relay 19 is energized contact 19e closes with contact 19g to connect terminal 14 to generator 11 through lead 16.

A normally open contact 27b of relay 27 is connected in series with motor 10 from direct current lead 12 to connect the motor across the direct current power supply when relay 27 is energized.

A coil 30a of a time delay relay 30 is connected in parallel with generator 11 and a normally closed contact 30b thereof remains closed for approximately 5 seconds after coil 30a is energized. Contact 30b is connected in series with a coil 31a of a relay 31 to lead 13 and across motor 10. An arc quenching condenser 32 is connected across the contact. A normally open contact 31b of relay 31 is connected in series with a power factor correcting capacitor 33, and a suitable fuse 34, in parallel with coil 30a across generator 11. Thus, during the 5 seconds during which time delay contact 30b remains closed subsequent to the energization of time delay relay 30, the power factor correcting capacitor 33 is connected across the output of the generator to correct the low power factor condition arising from the starting of motor 17. While the specific power rating of generator 11 would determine the capacity of capacitor 33, a 200 microfarad capacitor has been found to be suitable for use with a 750 watt generator.

It may be desired at times to utilize the converter to provide alternating current power to a device other than that connected to terminal socket 14. For this purpose, a second set of terminals 35 are connected across generator 11. Manually operable means are provided for actuating the converter to provide power to terminals 35 while preventing power from being applied concurrently to terminals 14, and concurrently disconnecting power factor correcting capacitor 33. These means comprise a double pole, double throw switch 36 having a first, normally closed contact 36a connected in series with generator 11 to contact 19g of relay 19. A normally open contact 36b of switch 36 is connected in parallel with the normally open contacts 18b of relay 18. A condenser 37 is connected in parallel with contacts 18b and 36b to eliminate arcing thereacross. A third, normally open contact 36c of switch 36 is connected in series with terminals 35 and serves to preclude power being drawn from terminals 35 when terminals 14 are energized. A suitable fuse 38 may be provided in the input lead 12 to protect the converter.

In Fig. 1, the converter circuit is shown as arranged when the external appliance connected to socket 14 is not requesting power. Under this condition, the 32 volt, direct current potentials of the input power supply is impressed on terminals 14. Thus, lead 13 is connected to one of the terminals through normally closed contact 19f—19e of relay 19, and lead 12 is connected to the other of the terminals through normally closed contacts 19b—19c of relay 19 (in series with resistors 20, 21 and 22 and coil 18a of relay 18). When switch 17a closes, a circuit is completed throuh motor 17 across terminals 14, and thus from lead 12 to lead 13. Resultingly, a small current, which is limited by the high impedance of resistors 20 and 21, flows through coil 18a of sensitive relay 18 substantially immediately operating the relay to close open contact 18b and energize relay coil 19a. Energization of relay coil 19a operates relay 19 to cause moving contacts 19b and 19e to close with normally open contacts 19d and 19g respectively, and to open the circuit from leads 12 and 13 to contacts 19c and 19e, respectively.

The connection of contact 19d to lead 12 energizes coil 27a of relay 27 effecting a closing of contact 27b thereof, thereby energizing motor 10. As generator 11 is directly coupled to motor 10, it is operated to provide the desired alternating current output power supply.

The breaking of the circuit to contact 19c from lead 12 and the circuit to contact 19e from lead 13 causes a discontinuation of current flow through coil 18a from the direct current power supply. However, current flow is maintained through coil 18a for a short period of time by the discharge of condenser 23 through resistor 20 and the coil. The time constant of this circuit is such that coil 18a is maintained energized thereby until the generator 11 output is sufficient to energize coil 18c through transformer 24. Illustratively, a condenser of 8 microfarad capacity may be used with a resistor of 50,000 ohms resistance where a suitable coil 18a having approximately 3800 ohms resistance is provided.

As discussed above, it is coil 18c which maintains contact 18b of relay 18 closed during the continued operation of the converter. As alternating current flows through resistor 22, the resultant voltage drop thereacross acts through transformer 24 to provide an alternating current across bridge 25 which rectifies this current to provide a direct current through coil 18c. In the illustrated embodiment resistor 22 has approximately ¼ ohm resistance and thus applies a ½ volt alternating current potential to the transformer when motor 17 draws 2 amperes current. Transformer 24 raises this voltage to approximately 2½ volts on the secondary side 24a for proper operation of the coil 18c. Thus, as long as the appliance connected to socket 14 draws such current, relay contact 18b remains closed, thereby continuously energizing coil 19a of relay 19 to maintain contacts 19b—19d closed and energize coil 27a to maintain contact 27b closed to energize motor 10 continuously.

When contact 27b closes to energize motor 10 it concurrently energizes coil 31a of relay 31 through the closed contact 30b of relay 30. Thus, contact 31b is closed and power factor correcting capacitor 33 is connected across the output of generator 11 to improve the power factor at socket 14 permitting the highly inductive starting-load of motor 17 to be accommodated by a relatively small current output of generator 11. Illustratively, a 750 watt connector has been found to be suitable for powering a conventional 6-8 cubic foot refrigerator. Approximately 5 seconds after coil 30a is energized it causes contact 30b to open, thereby deenergizing coil 31a and allowing contact 31b to open, thereby disconnecting the power factor correcting capacitor.

When it is desired to operate an appliance or device, such as a vacuum cleaner or small radio, which does not have power characteristics such as exhibited by motor 17, and when automatic coordinated operation of the converter with the operation of the appliance or device is not required, terminals 35 are utilized. To effect operation of motor 10 and generator 11 switch 36 is manipulated to close contact 36b. This effects energization of coil 19a which closes contacts 19b—19d to energize relay 27 and operate motor 10. No power is delivered to socket 14 at this time as switch 36a is opened when switch 36b is closed thereby breaking the circuit from generator 11 through contacts 19g—19e to the socket 14. This precludes drawing power from both sets of terminals 14 and 35 at the same time, thereby preventing overloading the generator 11, and further prevents utilizing socket 14 without the proper associated power factor correcting means. It should also be noted that direct current potential from leads 12 and 13 is never applied to terminals 35 as the circuit from lead 13 thereto is broken by the always open contacts 19g—19f.

As a result of the novel arrangement of the converter, no modification of the circuitry of the device or appliance to be operated is necessary. The converter is arranged to draw power from the input power supply only when the connected device or appliance is operated, this being accomplished either manually or automatically as desired. Further, the converter is arranged to permit operation with a relatively low current output generator of appliances and devices having low power factor starting characteristics.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Means for powering a device having a control switch from an electrical power source having a characteristic of a type other than that from which the device is to be operated, comprising: means connecting the device to the power source; converter means for converting the power from the source to a power supply having a characteristic proper for operation of the device; and means responsive to an operation of the control switch which tends to operate the device, to disconnect the device from the power source and to connect the converter means to the power source and device for operating the device.

2. Means for powering a device having an automatic control switch from an electrical power source having a characteristic of a type other than that from which the device is to be operated, comprising: means connecting the device to the power source; converter means for converting power from the source to a power supply having a characteristic proper for operation of the device; relay means responsive to a current flow to the device from the power source as a result of an operation of the control switch which tends to operate the device, to disconnect the device from the power source and to connect the converter means to the power source and device for operating the device; and means to maintain the relay means in the condition wherein the device is disconnected from the power source subsequent to discontinuation of current flow to the device from the power source, and until the control switch operates to discontinue operation of the device.

3. The means for powering a device as set forth in claim 2 wherein the last named means includes a condenser in parallel electrical association with the relay means arranged to discharge through the relay coil over a period of time and maintain the relay engaged.

4. The means of powering a device as set forth in claim 2 wherein the last named means includes a coil of said relay means in effective series electrical relationship with the control means and the device.

5. Means for powering a device having an induction motor and an automatic control switch from an electrical power source having a characteristic of a type other than that from which the motor may be properly operated, comprising: means connecting the device to the power source; converter means for converting the power from the source to a power supply having a characteristic proper for operation of the motor, including power factor correcting means; means responsive to an operation of the control switch which tends to operate the device, to disconnect the device from the power source and to connect the converter means to the power source and device for operating the device; and means for causing the power factor correcting means to be operative to affect the power supply characteristic only for a limited time immediately subsequent to the connection of the converter to the power source and device.

6. The means for powering a device as set forth in claim 5 wherein the converter means comprises a motor-generator set and the last named means comprises a relay having its coil connected in parallel with the motor of the motor-generator set and in series with a movably closed contact of a time delay relay having its coil connected in parallel with the generator of the motor-generator set, and a normally open contact of said first named relay connected in series with a power factor correcting capacitor, said series connected contact and capacitor being connected in parallel with the generator.

7. The means for powering a device as set forth in claim 5 wherein terminal means are provided for delivering power from the power supply other than to said device and manually operable means are provided to select alternative delivery to said terminal means and said device.

8. The means for powering a device as set forth in claim 7 wherein the manually operable means includes a switch in the circuit to the device arranged to be opened when the terminal means is selected.

9. Means for powering alternatively a first device having an automatic control switch and a second device having a manually operable control switch from an electrical power source having a characteristic of a type other than that from which each of the devices is to be operated, comprising: converter means for converting the power from the source to a power supply having a characteristic proper for operation of the devices; a first terminal means for connection thereto of the first device; control means to connect the first terminal means to the power source when the automatic control is arranged to prevent operation of the first device and to disconnect the first terminal means from the power source and connect the first terminal means to the converter means when the automatic control is arranged to permit operation of the first device, said control means causing said converter means to operate only when the automatic control is arranged to permit operation of the first device; and switch means manually operable to disconnect when desired the first terminal means from the converter means and power source, connect the second terminal means to the converter means, and cause said converter means to operate whereby said second device may be operated as desired by means of its manually operable control switch.

10. Means for powering a device having an induction drive motor and an associated control switch from an electrical power source having a characteristic of a type other than that from which the device is to be operated, comprising: means connecting the device to the power source; motor-generator converter means for converting the power from the source to a power supply having a characteristic proper for operation of the device; and means responsive to an operation of the control switch which tends to operate the device, to disconnect the device from the power source and to connect the motor of the converter means to the power source and the generator of the converter means to the device for operating the device.

11. Means for powering a device as set forth in claim 10 wherein the power source is one providing direct current.

12. Means for powering an electric refrigerator having a connector plug, a compressor, and an automatic thermostatic control switch, from a power source having a characteristic of a type other than that from which the device is to be operated, comprising: means having a socket for electrical engagement by the connector plug to connect the refrigerator to the power source; converter means for converting the power from the source to a power supply having a characteristic proper for operation of the refrigerator; and means responsive to an operation of the thermostat switch which tends to operate the refrigerator compressor, to disconnect the refrigerator from the power source and to connect the converter means to the power source and the refrigerator to the power supply for operating the refrigerator compressor.

No references cited.